July 3, 1962 P. J. VORE 3,041,833
TURBO JET AND TURBO PROP ENGINE RELITE DEVICE
Filed July 6, 1961 2 Sheets-Sheet 1

INVENTOR.
PAUL J. VORE
BY
ATTORNEYS

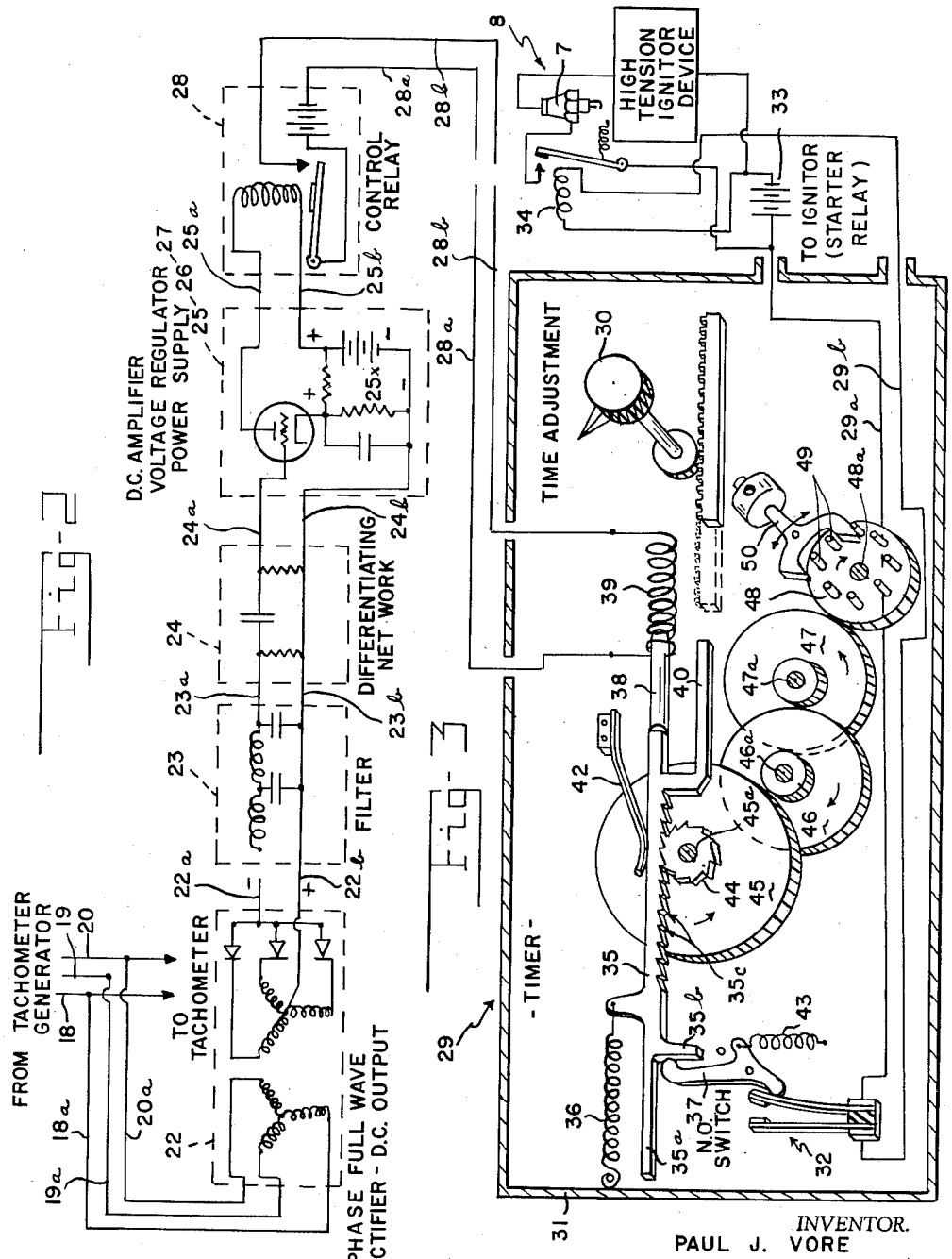

United States Patent Office 3,041,833
Patented July 3, 1962

3,041,833
TURBO JET AND TURBO PROP ENGINE RELITE DEVICE
Paul J. Vore, 4417 Needmore Road, Dayton 24, Ohio
Filed July 6, 1961, Ser. No. 122,358
6 Claims. (Cl. 60—39.09)
(Granted under Title 35, U.S. Code (1952), sec. 266)

The invention described herein may be manufactured and used by or for the United States Government for governmental purposes without the payment to me of any royalty thereon.

This invention relates to turbo jet and turbo prop engines and more particularly to ignition devices therefor, and has for an object the provision of means for preventing the cessation of operation of the engine occasioned by "flame out" by causing immediate "relight," following a "flame out."

A further object is a method and means of positive automatic "relight" for turbo jet and turbo prop engines which experience "flame out" during operational flight of an aircraft.

Another object of the invention is the provision of means which is operatively connected to a tachometer generator of a turbo jet or turbo prop engine, which is responsive to a change in the tachometer voltage, for instance a drop in the voltage, which happens immediately as the engine decelerates due to loss of combustion, and causes the conventional engine ignition system to be energized to actuate the ignitors and immediately provide the ignition necessary to restore the combustion process.

A further object is the provision of a device and method which provides improved reliability and has no internal engine parts to deteriorate, and provides greater simplicity of installation, being universal for all types of aircraft, and requires no special engine adaptation.

A further object is the provision of an automatic relight device which is simple in construction, and economical in cost, and employing conventional devices in a predetermined new and novel combination to provide means for producing an automatic "relight" device for turbo prop and turbo jet combustion engines operable upon a slight reduction in speed of the engine to energize the combustion chamber ignition devices for relighting the fuel supplied to the combustion chamber.

A further object includes the provision of a timer device in the combination for maintaining the ignitor device energized and in operation for a predetermined length of time following its energization due to a reduction in speed or r.p.m. of a turbo jet engine.

A further object is the provision of an ignition device for combustion engines of the gas turbine types which includes means operable by the turbine and responsive to a predetermined slight reduction in the r.p.m. of the turbine for energizing the combustion chamber ignitor device to provide ignition means for the fuel being supplied to the combustion chamber.

A further object includes a timer device for maintaining said ignitor device energized for a predetermined time interval immediately following the energization of the ignitor means.

Other objects and advantages of the invention will become apparent from the following description and accompanying drawings in which like reference characters refer to like parts in the several figures of the drawing.

In the drawings:

FIG. 2 is a schematic wiring diagram of the various elements or devices shown in the block diagram in FIG. 1; and FIG. 3 is a vertical sectional view of an adjustable timer device, such as may be employed as a timer, as indicated in FIG. 1, for initiating and prolonging the operation of the ignitor device for the gas turbine combustion chambers for a predetermined length of time.

Figure 1:
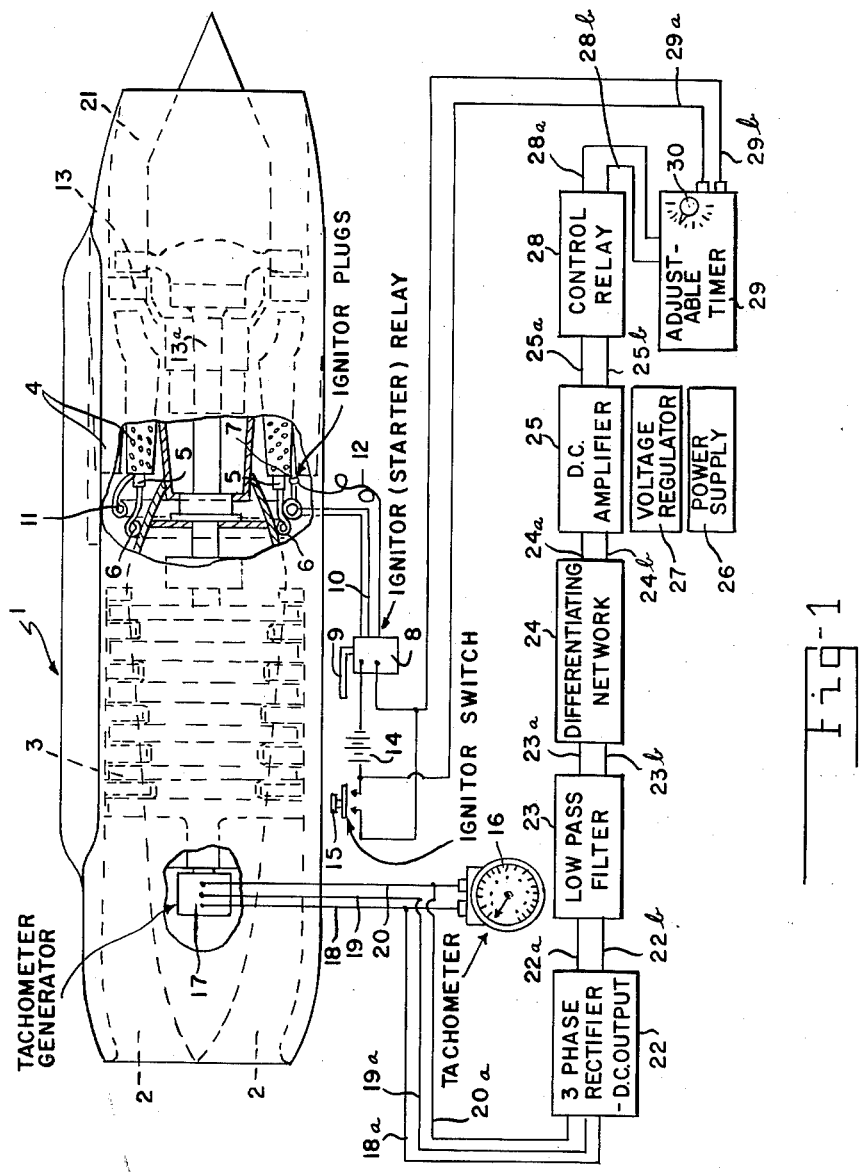
FIG. 1 is a somewhat diagramamtic view of a gas turbine or turbo jet engine showing my improved ignitor or engine relight device or system applied thereto, certain of the conventional details of the combination being shown in block diagrams and suitably indicated by legends.

Reference being made to FIG. 1, the reference numeral 1 denotes a conventional turbo jet or turbo prop engine having an air intake 2, a multistage compressor 3 for compressing air therefrom and delivering the same to the combustion units 4 which are supplied with fuel at 5 from a fuel supply manifold 6. The combustion chambers are supplied with relight devices, for instance ignitor plugs 7 which may be supplied with ignitor fuel under control of an ignitor (starter) relay 8 from a suitable fuel source through the supply pipe 9. This ignitor relay is conventional and when energized supplies fuel (for ignition) through the pipe 10 to the supply manifold 11. The relay, when energized, also closes a circuit supplying suitable current through the electric conductors 12 to the ignitor plugs 5. The relay 8 not only supplies fuel to the combustion chamber but also closes the circuit which supplies electrical current to the ignitor plugs 7.

Combustion products pass from the combustion chamber through the turbine wheel 13 which rotates or spins the compressor 3 through the hollow shaft $13^a$, suitable means (not shown) such as a motor initially spins the shaft $13^a$ up to starting speed, after which the ignitor relay 8 can be (manually) energized through battery 14 and suitable coils by depression of the key 15. The conventional engine is also provided with means for determining the r.p.m. of the engine which comprises a tachometer 16 controlled by a tachometer generator 17 driven by the compressor 3 which delivers current through the conductors 18, 19 and 20. The products of combustion are discharged through the exhaust passage 21. The aforedescribed structure is conventional.

When a turbo jet engine is started and brought up to speed, and is developing its predetermined propulsion thrust, the air entering the intake 2 and acted on by the compressor blades naturally causes considerable resistance to rotation of the turbine rotor, which is overcome by the expansion of the combustion gases leaving the combustion chambers and impinging on the turbine blades 13.

When a "flame out" occurs the pressure from the combustion chambers rotating the turbine immediately ceases, and the resistance of the compressor blades 3 almost instantly materially reduces the speed of rotation of the turbine. This deceleration of the turbine immediately changes the potential energy from the tachometer generator 17 in the conductors 18, 19 and 20 and the tachometer 16 shows a corresponding drop in r.m.i. The structure shown and described takes advantage of this immediate deceleration of the turbine to instantly energize the ignitor means 7 to relight the combustion products in the combustion chambers 4 so that the engine will not materially lose thrust.

As shown in the block diagram in FIG. 1 the three energizing conductors 18, 19 and 20 delivering a three phase A.C. signal from the tachometer generator 17 are respectively connected by three electrical conductors $18^a$, $19^a$ and $20^a$ to a conventional three phase full wave rectifier 22 (also shown in the electrical diagram in conventional electrical symbol manner) which produces a D.C. output in the conductors $22^a$ and $22^b$ which are connected to the input of a conventional low pass filter 23, producing a filtered or smoothed out D.C. output in the filter output conductors $23^a$ and $23^b$ which are connected to the input of a differentiating network 24 (also shown in electrical symbol manner in FIG. 2).

The three phase A.C. signal from the engine driven tachometer 17 being fed into the three phase full wave rectifier 22, produces a pulsating D.C. at the rate of six times the frequency of tachometer generator signal, after which the pulsating D.C. current is smoothed out in the low pass filter 23, producing D.C. (or near D.C.) as it enters the differentiating network 24 which senses the rate of change in D.C. signal voltage from the filter 23 producing a D.C. output when there is any change in the D.C. signal.

The D.C. output from the differentiating network 24 (when it occurs) is delivered by the conductors 24$^a$ and 24$^b$ to a conventional D.C. amplifier 25 supplied by a suitable electric battery or power supply 26 under the control of a conventional voltage regulator 27.

The D.C. amplifier is constructed as shown to produce an electrical potential or pulses of one potential when the r.p.m. of the compressor increases and produces a potential or pulses of the other polarity when the r.p.m. decreases, and provides means responsive to potential or pulses of the polarity produced when the r.p.m. of the compressor decreases for energizing the ignitor means.

As seen in the diagram in FIG. 2 when the D.C. signal from the filter 23 increases (or when the tachometer generator 17 r.p.m. increases) the differentiating network 24 produces a negative output which is fed into the control grid circuit 25$^x$ of the D.C. amplifier 25. However, the D.C. amplifier circuit is adjusted to operate (as shown) only when a positive voltage of a lower setting limit occurs, which is manually preset by a sensitivity control in the D.C. amplifier 25.

The output of the D.C. amplifier 25 is delivered by the conductors 25$^a$ and 25$^b$ to the conventional control relay 28 having an energizing control circuit 28$^a$ and 28$^b$ for energizing the adjustable timer device when the control relay 28 is closed. The timer 29 may be of any conventional type, providing an electrical energizing circuit output through conductors 29$^a$ and 29$^b$ when the timer is energized by the closing of the control relay 28. Suitable adjustable timing cycle control means is provided in the timer for manual adjustment by a setting knob or handle 30.

Since the D.C. amplifier circuit is adjusted to operate only when a positive potential of a lower limit setting occurs, therefore the D.C. amplifier will not actuate the control relay 28 when a negative voltage on the control grid of the D.C. amplifier occurs, such as when the jet engine speeds up.

When the D.C. signal from filter 23 decreases (or when the tachometer generator r.p.m. decreases) there will be a positive voltage output from the differentiating network 24, and if this positive voltage is great enough (or above the preset value) the D.C. amplifier will respond and actuate the control relay 28, which will energize the timer 29 and turn on the ignitor system 7, 8 and hold it on until the timer 29 goes through its timing cycle, after which the control relay 28 and timer 29 will return to their original positions, the duration of the timing cycle being adjustable by the control or setting knob 30.

The power supply 26, which may be conventional, can consist of a power transformer, rectifier tube and filter circuit (or a battery) for producing D.C. for plate currents. The voltage regulator 27 may be a conventional tube device which regulates the D.C., therefore, stabilizing the gain of the D.C. amplifier 25, while the control relay 28, when actuated, closes normally-open contacts which are connected to the combustion chamber ignitor device 7, 8 when there is a rapid change in tachometer generator r.p.m. from any level to a lower r.p.m.

The adjustable timer 29 may be any suitable conventional timer, for instance, a timer may be employed of a type similar to that shown in FIG. 3. With reference to the timer shown in FIG. 3 the reference numeral 31 denotes the case or housing, in which is mounted the normally open switch 32 for closing the circuit through the battery or other power source 33 to the combustion chamber ignitor device 7, 8, through the relay 34 through the conductors 29$^a$, 29$^b$.

Reciprocatably mounted within the casing 31 is a "ratchet" bar 35 having a power spring 36 urging the bar to the left, the bar 35 having a stop extension 35$^a$ limiting the movement of the bar to the left under influence of the spring 36. The bar 35 has a downwardly extending abutment arm 35$^b$ which rocks the three armed lever 37 anticlockwise at the left hand limit of movement of the bar 35 to permit the switch contacts to open.

The right hand end of the bar 35 carries an armature or core 38 for the solenoid coil 39 in circuit with the conductors 28$^a$, 28$^b$ from the control relay 28.

When the relay 28 is energized the solenoid 39 jerks the ratchet bar 35 to the right. However, its movement to the right is limited by the stop arm 40 on the bar 35 and its abutting engagement with the end of the axially adjustable stop bar 41, axially adjustable to different positions (as seen in dotted lines) by the control knob 30, for instance through a rack and pinion, or worm adjustment connection.

A yieldable "holddown" spring 42 is provided, maintaining a yieldable downward pressure on the top surface of the bar 35. When the bar 35 is drawn to the right by the solenoid 39 the arm 35$^b$ moves out of the way and permits the spring 43 to rock the lever 37 clockwise to effect closing of the switch 32 and operation of the ignition device 7, 8.

The ratchet teeth 35$^c$ on the bar 35 are disposed for engagement with complementary ratchet teeth 44 on a first spur gear 45 of an "escapement" mechanism comprising a train of meshing gears 46, 47 and 48, the gear 48 including escapement pins 49 and cooperating a weighted escapement lever 50. The gears are suitably pivoted on shafts 45$^a$, 46$^a$, 47$^a$ and 48$^a$ respectively, fixed in the casing 31.

When the solenoid 39 is energized by the control relay 28, due to a drop in r.p.m. of the turbine rotor, the ratchet bar 35 will be drawn to the right a predetermined distance, limited by the adjustment of the stop bar 41 under the influence of the adjustment knob 30, the teeth 35$^c$ on the bar 35 overriding the ratchet teeth 44 on the first gear 45 of the escapement or timing mechanism. The bar 35 will remain in this right hand position until the solenoid 39 is deenergized by the control relay 28. Then the spring 36 will draw the bar 35 slowly to the left under the control of the escapement mechanism. The final movement to the left causes the arm 35$^b$ to rock the switch-closing lever 37 anticlockwise, permitting the switch blades 32 to open and interrupt the operation of the ignitor device 7, 8.

It is to be understood that while there has been shown and described a preferred embodiment of the invention, it is not desired or contemplated that the invention should be limited to the particular details of construction and arrangement of elements disclosed by way of illustration and exemplification, as these may be changed and modified by those skilled in the art without departing from the spirit of the invention or exceeding the scope of the appended claims.

I claim:

1. In combination with a turbo jet engine having a combustion chamber, a rotary compressor for supplying air to said combustion chamber, and means for supplying fuel to said combustion chamber to form with said air a combustion mixture in said combustion chamber, ignitor means for said combustion chamber for igniting the combustion mixture in said combustion chamber, gas turbine means driven by said combustion products from said combustion chamber and connected to said compressor for driving the same, tachometer generator means driven by said compressor having a three phase A.C. electrical output proportional to speed, means for rectifying, smoothing and differentiating the output of said generator means to produce an electrical pulse potential of one polarity when the r.p.m. of the generating means driven by the compressor increases and of the other polarity when the r.p.m. of the generator means decreases, and means responsive only to the pulse output of the polarity produced when the r.p.m. decreases for energizing an electrical timing circuit including a timer device connected to said ignitor device for energizing said ignitor for the duration of time controlled by said timer following the energization thereof by said electrical timing circuit.

2. The combination as set forth in claim 1 in which said timing device is adjustable for varying the time duration of operation of said ignitor device.

3. In an apparatus for turbo jet and turbo prop engines of the gas turbine types having an air intake, a multi-stage rotary compressor receiving air from said air intake, a combustion chamber receiving air under pressure from said compressor, fuel supply means for supplying fuel to said combustion chamber to form a combustion mixture in said combustion chamber, a gas turbine connected to said compressor for rotation of said compressor, driven by products of combustion from said combustion chamber, electrically responsive ignitor means for said combustion chamber for igniting the combustion mixture in said combustion chamber, generator means connected to said compressor for generating an A.C. potential proportional to the r.p.m. of said compressor, a full wave rectifier connected to said generator A.C. potential output for producing a D.C. potential from the A.C. output from said generator, filter means connected to said rectifier for smoothing out the D.C. potential from said rectifier, a differentiating network connected to said filter for producing an electrical potential of one polarity when the D.C. potential from said filter increases, as a result of an increase in r.p.m. of said compressor, and producing an electrical potential of the other polarity when the electrical potential from said filter decreases, means responsive only to the electrical potential from said filter when the electrical potential therefrom decreases for producing an electrical signal, a timer control relay connected to the output of the last named means to be energized by the electrical output therefrom, an energizing circuit connected to said relay to be closed thereby, a timer device connected to said relay to be energized thereby, said timer having an energizing circuit therefrom connected to said ignitor device for actuating said ignitor, upon a reduction in r.p.m. of said compressor, to relight the combustion products in said combustion chamber, following a "flame out" therein.

4. In an apparatus for turbo jet and turbo prop engines of the gas turbine types having an air intake, a multi-stage rotary compressor receiving air from said intake, a combustion chamber receiving air under pressure from said compressor, fuel supply means for supplying fuel to said combustion chamber to form a combustion mixture in said combustion chamber, a gas turbine connected to said compressor for rotation thereof, driven by the products of combustion from said combustion chamber, electrically responsive ignitor means for igniting the products of combustion in said combustion chamber, three phase A.C. generator means connected to said compressor for producing an A.C. potential proportional to the r.p.m. of said compressor, means for rectifying said A.C. potential to provide a pulsating D.C. potential proportional to the r.p.m. of said compressor, a D.C. fiter for smoothing out said pulsating D.C. potential, a differentiating network for producing an electrical signal only upon a decrease in the D.C. potential from said filter, caused by a decrease in r.p.m of said compressor, and ignitor control means responsive to said electrical signal from said differentiating network, connected to said ignitor means for energizing said ignitor means to reignite the combustion mixture in said combustion chamber upon a decrease in r.p.m of said compressor and said turbine due to "flame out" in said combustion chamber.

5. Apparatus as claimed in claim 4 in which said ignitor control means includes a relay device, a timer energized by said relay device, and an energizing circuit for said ignitor closed by the timer for the timing duration of operation of said ignitor means.

6. Apparatus as claimed in claim 5, wherein said timer is adjustable to provide different predetermined time durations during which said ignitor is energized, following the energization of the timer by said relay device.

References Cited in the file of this patent

UNITED STATES PATENTS 2,617,253    Fusner _____ Nov. 11, 1952

FOREIGN PATENTS 660,178    Great Britain _____ Oct. 31, 1948